US012098586B2

(12) United States Patent
Poenariu et al.

(10) Patent No.: US 12,098,586 B2
(45) Date of Patent: Sep. 24, 2024

(54) GLAZING BEADS AND METHODS OF ASSEMBLY USING SAME

(71) Applicant: Coastal Industries, Inc., Jacksonville, FL (US)

(72) Inventors: Florin Poenariu, Jacksonville, FL (US); William Cobb, Jr., Jacksonville, FL (US); Patrick Cobb, Jacksonville, FL (US)

(73) Assignee: Coastal Industries, Inc., Jacksonville, FL (US)

( * ) Notice: Subject to any disclaimer, the term of this patent is extended or adjusted under 35 U.S.C. 154(b) by 0 days.

(21) Appl. No.: 17/724,401

(22) Filed: Apr. 19, 2022

(65) Prior Publication Data

US 2023/0332459 A1 Oct. 19, 2023

(51) Int. Cl.
*E06B 3/58* (2006.01)

(52) U.S. Cl.
CPC .......... *E06B 3/5842* (2013.01); *E06B 3/5821* (2013.01)

(58) Field of Classification Search
CPC ........ E06B 3/5454; E06B 3/58; E06B 3/5821; E06B 3/5842; E06B 3/62; E06B 2003/6244; E06B 2003/6247; E06B 2003/6258
See application file for complete search history.

(56) References Cited

U.S. PATENT DOCUMENTS 4,006,569 A * 2/1977 Kain ..................... E06B 3/5454 52/204.597
4,480,417 A * 11/1984 Evers ......................... B60J 1/17 52/800.14
5,735,089 A * 4/1998 Smith ....................... E06B 3/62 49/63
9,506,247 B2 * 11/2016 Feldpausch ............... E06B 1/36
11,060,341 B1 * 7/2021 Sprague .................. E06B 3/549
11,187,323 B2 * 11/2021 Sprague ............... F16J 15/0818
2015/0275513 A1 10/2015 Feldpausch et al.
2021/0285546 A1 * 9/2021 Sprague ................ E06B 3/5454

FOREIGN PATENT DOCUMENTS

CN 113216803 A * 8/2021
DE 2732155 A * 1/1979 ............... E06B 3/62
DE 19518877 A1 * 11/1996 ............... E06B 3/62
DE 29618634 U1 * 2/1997 ............... A47K 3/38
DE 19634079 A1 * 2/1998 ............... E06B 3/08
EP 1270862 A2 * 1/2003 ............... E06B 3/62
EP 2131005 A1 * 12/2009 ............... E06B 3/62
EP 2148037 A2 * 1/2010 ............... E06B 3/62
EP 2278109 A2 * 1/2011 ............... E06B 3/62
EP 2777459 A1 * 9/2014 ............. A47K 3/283
(Continued)

OTHER PUBLICATIONS

Office Action in corresponding Canadian patent application No. 3,155,556, dated May 12, 2024, in 9 pgs.

*Primary Examiner* — Ryan D Kwiecinski

(74) *Attorney, Agent, or Firm* — Bradley Arant Boult Cummings, LLP; Phillip E. Walker; Alex H. Huffstutter

(57) ABSTRACT

Embodiments of the present disclosure include a glazing bead system and methods of using the same. The systems and methods can include a frame interface member with structural features that enable the practical and automated coupling of the frame interface member to a frame constituent, before a panel is inserted within the frame interface member.

13 Claims, 8 Drawing Sheets

(56) References Cited

FOREIGN PATENT DOCUMENTS

| | | | | | |
|---|---|---|---|---|---|
| ES | 2592809 | A1 | * 12/2016 | ............... | E04B 2/74 |
| FR | 2287575 | A | * 6/1976 | ............... | E05D 5/02 |
| FR | 2303148 | A | * 11/1976 | ............... | E06B 3/28 |
| FR | 2755723 | A1 | * 5/1998 | ............... | E06B 3/62 |
| GB | 2142370 | A | * 1/1985 | ............... | E06B 3/62 |
| GB | 2390404 | A | * 1/2004 | ............... | E06B 3/62 |
| GB | 2512150 | A | * 9/2014 | ............... | E04B 2/82 |
| JP | 2019218711 | A | * 12/2019 | ........... | E06B 3/5454 |
| NL | 9001649 | A | * 2/1992 | ............... | E06B 3/62 |
| NL | 2003495 | C | * 3/2011 | ............... | E06B 3/62 |
| WO | WO-9807947 | A1 | * 2/1998 | ............... | E06B 3/08 |
| WO | WO-0236919 | A1 | * 5/2002 | ............... | E06B 3/62 |
| WO | WO-2005068764 | A1 | * 7/2005 | ............. | A01N 25/12 |
| WO | WO-2012145799 | A1 | * 11/2012 | ........... | E06B 3/4609 |

* cited by examiner

GLAZING BEADS AND METHODS OF ASSEMBLY USING SAME

FIELD OF THE INVENTION

This invention relates to the field of glazing beads, and more particularly, to an improved glazing bead that facilitates and improves manufacturing and enables customization of framed or semi-framed windows, dividers, and door panels.

BACKGROUND

Development of materials and new designs have improved environmental seals in framed and semi-framed window and door panels over the last few decades. For example, silicones that can be used to safely secure glass panels to a frame or part of a frame have been implemented. As the industry shifted from wooden frames to extruded metal frames (e.g., aluminum), "liquid" silicones, which were often messy, were largely replaced with "flexible" vinyls.

These flexible vinyls come in large rolls of material that must be stretched and cut at various lengths before and during the glazing process. As part of the glazing process, the perimeter of a glass panel is lined with lengths of the vinyl for frame constituents to subsequently be inserted (with some resistance from the vinyl) so that the vinyl encapsulates the edges of the glass to be framed. This process is laborious, time-consuming, risks damage to the panels, and requires operator training.

Accordingly, there is a need for a relatively low-cost improved bead glazing solution that incorporates structural features to enable facilitated mating of the vinyl to a frame constituent. There is also a need for improved bead glazing designs that enable improved and more reliable environmental seals. A further need exists for improved bead glazing designs for automated manufacturing and assembly processes. There is also a need for improved bead glazing designs that enable the incorporation of interchangeable design aesthetic elements. Further, there is a need for designs that provide improved protection from glass damage. Accordingly, practical and configurable glazing beads that can improve manufacturing and assembly processes and overcome the aforementioned needs are desired.

BRIEF SUMMARY

In a first aspect, a glazing bead system is provided. The glazing bead system includes a frame interface member comprising a body. The body comprises a base, a first sidewall, and a second sidewall. The base, the first sidewall, and the second sidewall each comprise an interior surface and an external surface. The glazing bead system may comprise a flexible seal on a top surface of one or more of the first and second sidewalls. The frame interface member includes a channel defined by the interior surfaces of the base and the first and second sidewalls. The frame interface member comprises a coupling protrusion disposed on the exterior surface of at least one of the first or second sidewalls.

The frame interface member includes a first securing member disposed on the interior surface of the first sidewall and a second securing member disposed on the interior surface of the second sidewall. Each of the first and second securing members may extend inwardly and downwardly into the channel and toward the base. The first securing member may be disposed oppositely across the channel from the second securing member to form at least one pair of opposing securing members. The glazing bead system may include at least five rows of securing members, wherein the first securing member and the second securing member are arranged in a first row of the five rows.

Each of the body and the coupling protrusion are constructed of a rigid material. The rigid material may be a Shore hardness of up to 100D. Each of the first and second members are constructed of a flexible material. The flexible material may have a shore hardness of up to 100A.

The glazing bead system may comprise a frame constituent. The frame constituent may include an interface member abutting surface, a first frame wall, and a second frame wall. The interface member abutting surface and the first and second frame walls may each comprise an interior surface and an external surface. The frame constituent may include an interface retention portion defined by the interior surfaces of the interface member abutting surface and the first and second frame walls. The body of the frame interface member may have a frame interface member profile, and the interface retention portion may have an interface retention portion profile that is substantially complementary to the frame interface member profile. The frame constituent may include a coupling recess disposed on the interior surface of at least one of the first and second frame walls. The coupling protrusion may have a coupling protrusion profile and the coupling recess may have a coupling recess profile that is substantially complementary to the coupling protrusion profile. The coupling protrusion may be configured to friction fit within the coupling recess.

Each of the coupling protrusion and the coupling recess may comprise an angled surface and an opposite surface. The angled surface of the coupling protrusion may be complementary to the angled surface of the coupling recess and the opposite surface of the coupling protrusion may be complementary to the opposite surface of the coupling recess. The angled surfaces of the coupling recess and the coupling protrusion may be configured to permit insertion of the frame interface member into the interface retention portion of the frame constituent. The opposite surfaces of the coupling recess and the coupling protrusion may be configured to resist removal of the frame interface member from the interface retention portion. A cap may be configured to be positioned and affixed over the coupling protrusion.

In a second aspect, a method for glazing a panel is provided. The panel may be a shower door panel, a window panel, or a room divider panel. The method includes providing a panel comprising an edge and at least one surface. The method includes providing a frame interface member. The method includes providing a frame constituent. The method includes inserting the frame interface member into the interface retention portion of the frame constituent until the coupling protrusion seats within the coupling recess. The inserting of the frame interface member into the interface retention portion may include inserting the frame interface member into the interface retention portion until: the lower pair of opposing coupling protrusions seat within the upper pair of coupling recesses; or the lower pair of opposing coupling protrusions seat within the lower pair of coupling recesses and the upper pair of coupling protrusions seat within the upper pair of coupling recesses. The method includes positioning the edge of the panel along the channel of the frame interface member. The method includes inserting the edge of the panel into the channel of the frame interface member until the first and second securing members frictionally engage with the at least one surface of the panel to secure the panel within the channel.

The method may comprise creating a substantially water-impermeable seal between the frame interface member and the frame constituent, between the panel and the frame interface member, or a combination thereof.

In a third aspect, a frame interface member for the glazing of a panel (such as a shower door panel, a window panel, or a room divider) is disclosed. The frame interface member comprises a rigid body including a base, a first sidewall, and a second sidewall. The base and the first and second sidewalls each comprise an interior surface and an external surface. The frame interface member comprises a channel defined by the interior surfaces of the base and two sidewalls. The frame interface member comprises a flexible first securing member disposed on the interior surface of the first sidewall and a flexible second securing member disposed on the interior surface of the second sidewall. Each of the first and second securing members extends inwardly and downwardly into the channel and toward the base.

A rigid coupling protrusion may be disposed on the exterior surface of at least one of the first or second sidewalls. The first and second securing members may have a Shore hardness of up to 100A. The body of the frame interface member may comprise a Shore hardness of up to about 100D. The first and second sidewalls may each comprise a top surface. The frame interface member may further comprise a flexible seal disposed on the top surface of at least one of the two sidewalls.

The above presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

A detailed explanation of the invention and aspects thereof is provided in the following detailed descriptions and appended claims taken in conjunction with the accompanying drawings.

BRIEF DESCRIPTION OF THE DRAWINGS

The accompanying drawings, which are included to provide a further understanding of the invention, illustrate non-limiting, exemplary embodiments of the invention. Reference will now be made to the accompanying drawings, which are not necessarily drawn to scale. Like reference numerals may indicate corresponding parts in various drawings. Without limiting the range of possible configurations, the foregoing and other features or aspects of the present disclosure will be readily apparent from the following detailed description and drawings of exemplary illustrative embodiments of the invention.

DETAILED DESCRIPTION

Figure 1A:
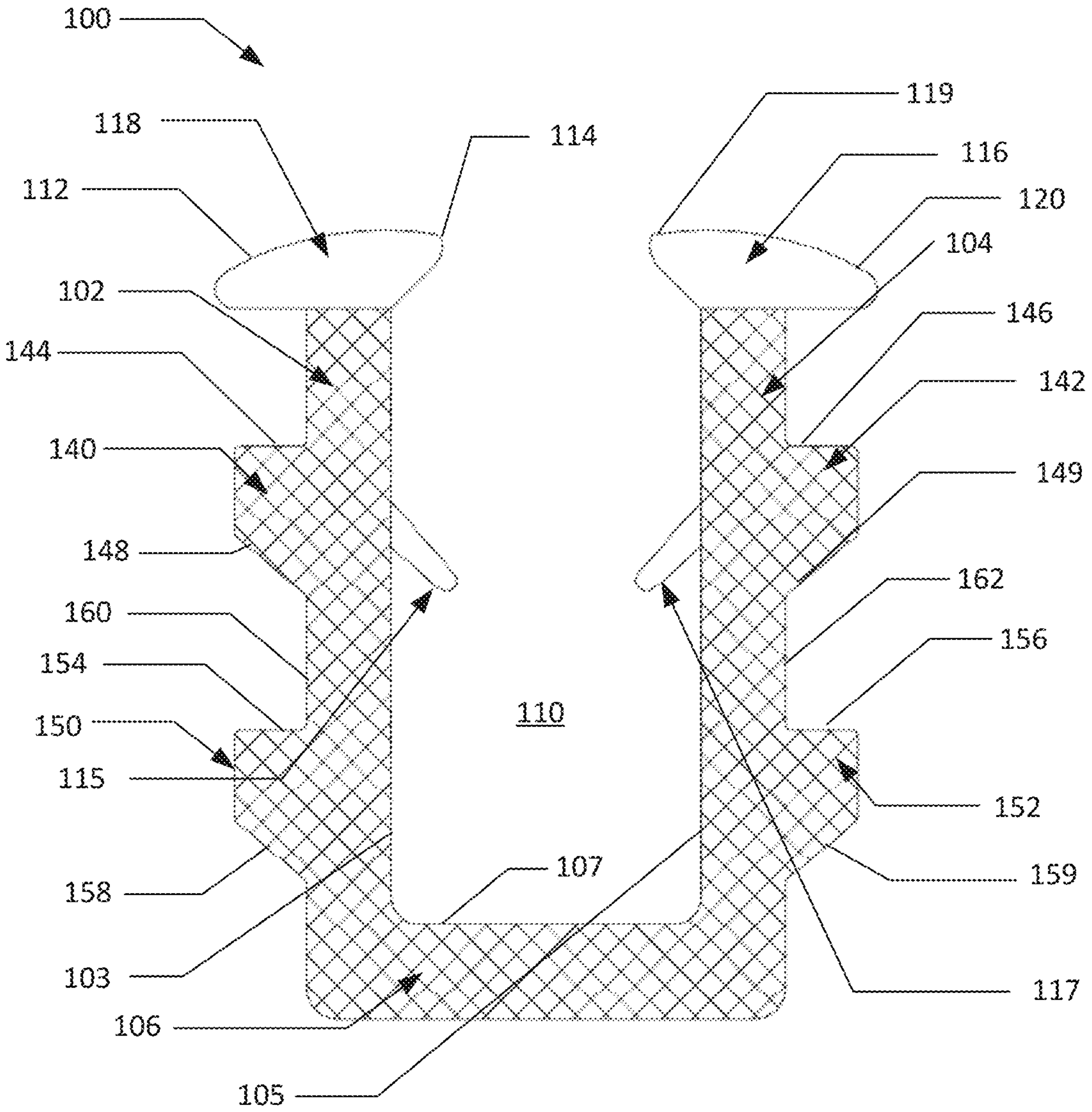
FIG. 1A shows a cross-sectional view of an exemplary frame interface member according to embodiments of the disclosure.

Reference now will be made in detail to exemplary embodiments of the present disclosure. It will be apparent to those of ordinary skill in the art that various modifications and variations can be made to the teachings of the present disclosure without departing from the scope of the disclosure. For instance, features illustrated or described as part of one embodiment can be used with another embodiment to yield a further embodiment.

Unless otherwise defined, all technical and scientific terms used herein can have the same meaning as commonly understood by one of ordinary skill in the art to which this invention belongs. In the case of conflict, the present specification, including definitions, will control. In addition, the materials, methods, and examples are illustrative only and are not intended to be limiting.

To the extent the definitions of terms in the publications, patents, and patent applications incorporated herein by reference are contrary to the definitions set forth in this specification, the definitions in this specification control.

The terminology used herein is for the purpose of describing particular implementations only and is not intended to be limiting. It should be noted that, the singular forms "a," "an," and "the" include plural forms as well, unless the content clearly dictates otherwise. To the extent that the terms "including," "includes," "having," "has," "with," or variants thereof are used in either the detailed description or the claims, such terms are intended to be inclusive in a manner similar to the term "comprising."

The term "about" means within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art.

Alternatively, "about" can mean a range of up to 20%, up to 10%, up to 5%, or up to 1% of a given value. Alternatively, the term can mean within an order of magnitude, preferably within 5-fold, within 4-fold, within 3-fold, within or within 2-fold of a recited value.

For the sake of clarity, not all reference numerals are necessarily present in each drawing figure. In addition, positional terms such as "upper," "lower," "side," "top," "bottom," "vertical," "horizontal," etc. refer to the embodiments when in the orientation shown in the drawings. The skilled artisan will recognize that the embodiments can assume different orientations when in use.

Various aspects of the glazing bead system and related method of assembly of the present disclosure may be illustrated by describing components that are coupled, attached, or joined together. As used herein, the terms "bonded," "coupled," "attached," and "joined" may be used interchangeably to indicate either a direct connection between two or more components or, where appropriate, an indirect connection between two or more components. Exemplary indirect connections can comprise intervening or intermediate components. In contrast, when a component is referred to as being "directly coupled," "directly attached," or "directly joined" to another component, there is no intervening element present.

Various aspects of the glazing bead and related method of assembly using same can be illustrated with reference to one or more exemplary embodiments. As used herein, the term "exemplary" means "serving as an example, instance, or illustration," and should not be construed as preferred or advantageous over other embodiments taught herein.

"Frame constituent," as used herein, can refer to a frame or any portion thereof. In embodiments, the frame constituent comprises at least a portion of a frame of a door, a partition, or a window. In some embodiments, the frame constituent comprises a substantially fixed cross-sectional profile. The frame constituent can comprise a molded material, an extrudate, a shaped material, a sculpted material or a combination thereof. In embodiments, the frame constituent comprises any one or more of the following materials: metal, wood, fiberglass, plastic, including polyvinyl chloride or any similar synthetic plastic, and rubber. The frame constituent can comprise aluminum or any synthetic plastic polymer material substantially similar to PVC. In certain embodiments, the frame constituent comprises a composite of any one or more of the foregoing materials. In embodiments, the frame constituent comprises extruded aluminum.

The terms "extrusion," "extrudate," and "extruded material" may be used interchangeably and can refer to a frame constituent that was generated from an extrusion process.

As used herein, the terms "glazing bead" and "frame interface member" are used interchangeably and can refer to a strip of material or trim that surrounds the edge of a panel and is configured to hold the panel in place. A glazing bead or frame interface member can be further configured to provide a seal along the edge of the panel.

As used herein, "panel" can refer to any of various structures that can be set in a frame or a framed structure as known in the art. In embodiments, a panel includes a sheet of glass, wood, metal, plastic, or any combination thereof which may be suitable for a door (such a shower door or a patio door), a window, or a room partition or divider. In some embodiments, the panel is a glass shower panel or a glass shower door.

As used herein, the phrase "rigid material" refers to a Shore D material on the durometer Shore hardness scale. Rigid material can comprise a material with a durometer between about 10D and about 100D or any subvalue therein or subrange thereof. Rigid material can comprise a material with a Shore hardness of between about 30D to 90D or any subvalue therein or subrange thereof. In embodiments, rigid material comprises a Shore hardness of about 40D, about 50D, about 60D, about 70D, about 80D, about 90D, or about 100D. In certain embodiments, the hardness of rigid material is about 70D.

As used herein, the phrase "flexible material" refers to a Shore A material on the durometer Shore hardness scale. Flexible material can comprise a material with a Shore hardness of up to about 100A. The flexible material described herein can comprise a shore hardness of between about 10A to about 100A. Flexible material can comprise a material with a Shore hardness of between about 30A to about 90A or any subvalue therein or subrange thereof. In embodiments, the flexible material comprises a Shore hardness of about 40A, about 50A, about 60A, about 70A, about 80A, about 90A, or about 100A. In certain embodiments, the Shore hardness of flexible material is about 80A.

Any Shore hardness value recited herein can be obtained using ASTM D2240 or similar standardized methods of measuring the relative hardness of materials commonly used in glazing bead systems.

The embodiments of the disclosure and the various features and advantageous details thereof are explained more fully with reference to the non-limiting embodiments and examples that are described or illustrated in the accompanying drawings and detailed in the following description. It should be noted that the features illustrated in the drawings are not necessarily drawn to scale, and features of one embodiment may be employed with other embodiments as one skilled in the art would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law.

Figure 1B:
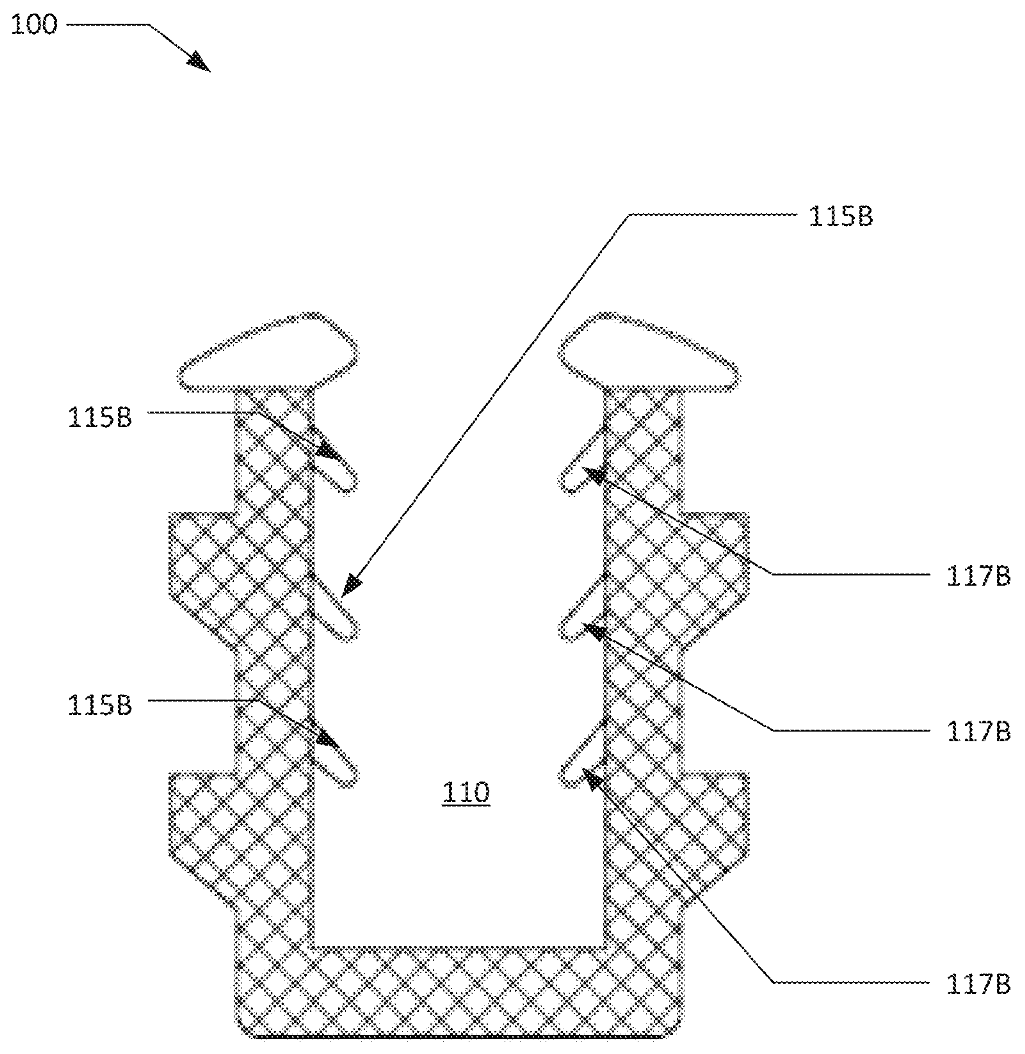
FIG. 1B shows a cross-sectional view of another exemplary frame interface member according to embodiments of the disclosure.
Figure 1C:
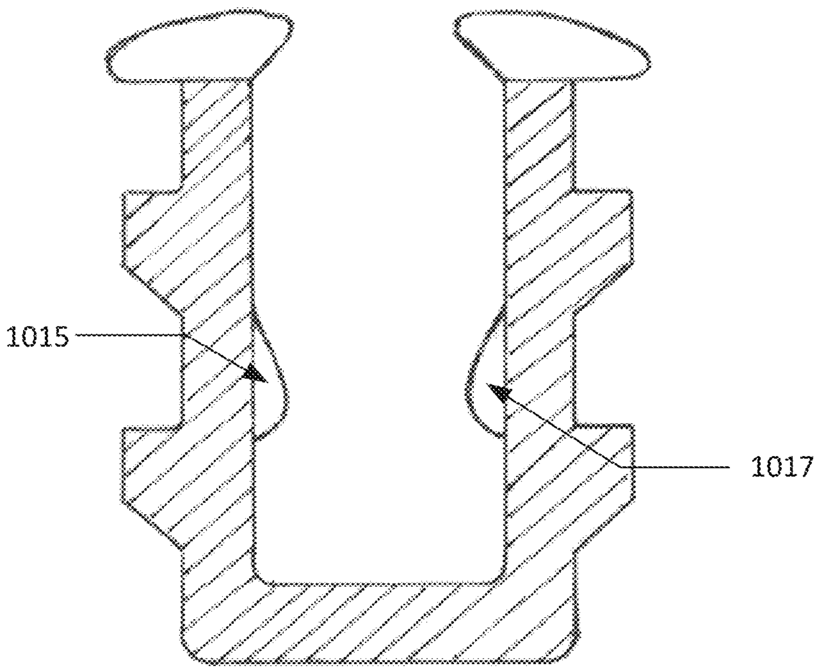
FIG. 1C shows a cross-sectional view of another frame interface member according to additional embodiments of the disclosure.

FIGS. 1A-1C provide cross-sectional views of an exemplary frame interface members 100 that can be used for securing a panel with a frame constituent 200A, 200B (shown in FIGS. 2A and 2B) according to certain aspects of the disclosure. In embodiments of the frame interface member 100, such as that shown in FIG. 1A, the frame interface member 100 includes a body 101 that comprises a first and a second opposing sidewalls 102, 104, and a base 106 disposed at one end of each of the two opposing sidewalls 102, 104. The sidewalls 102, 104 and the base 106 each comprise an interior surface 103, 105, 107. Together, the interior surfaces 103, 105, and 107 define a channel 110. As can be seen, in embodiments such as FIGS. 1A-1C, the frame interface member can comprise a substantially U-shaped body and profile. In exemplary embodiments, the corners along the interior surfaces 103, 105, 107 of the frame interface member 100 can be rounded (as pictured in FIG. 1A) or sharply angled (such as a 90° angle, as pictured in FIG. 1B) where each of the sidewalls joins with the base. In alternative embodiments, the frame interface member comprises a substantially W-shaped body, a substantially V-shaped body, a substantially H-shaped body, or any other suitable shaped body.

The channel 110 can be configured to receive and secure an edge of a panel (not shown) therein. By way of non-limiting example, the channel 110 may receive any panel that can be suitable for use as a door, window, room partition, or room divider, including those for showers. The channel 110 can be configured to receive, for example, an edge of a glass, wooden, metal, plastic panel, or any combination thereof. In embodiments, the channel 110 is configured to reversibly (i.e., removably) secure a panel therein.

The interior surfaces 103, 105 of one or more of the sidewalls 102, 104 can include at least one securing member 115, 117 that extends medially into the channel 110. In certain embodiments, the one or more securing members 115, 117 extend inwardly toward the channel 110 and downwardly toward the base 106, as shown in FIGS. 1A and 1B. The securing members 115, 117 can be configured to secure a panel within the channel 110 of the frame interface member 100. The securing member 115, 117 can be configured to frictionally engage with at least one surface of the panel such that the panel is secured within the channel 110. In certain embodiments, the securing members 115, 117 reversibly secure the panel within the channel 110. Advantageously, securing members 115, 117 prevent, or reduce the likelihood of occurrence of, panel breakage when the panel is seated within the channel 110.

In some embodiments, each sidewall 102, 104 contains a securing member 115, 117 such that the frame interface member 100 comprises at least two total securing members 115, 117 (as shown in FIG. 1A with opposing securing members 115, 117). Embodiments can comprise a single securing member 115. Alternative embodiments can comprise more than two securing members 115, 117. The frame interface member 100 can comprise up to fifty securing members 115, 117 or twenty securing members 115, 117. The frame interface member 100 can comprise one, two, three, four, five, six, seven, eight, nine, ten, eleven, twelve, thirteen, fourteen, or fifteen securing members 115, 117. In embodiments, the number of securing members 115, 117 is proportional to the depth of the channel 110. For example, the number of securing members 115, 117 can increase with the height of the sidewall 102, 104 (i.e., the depth of the channel 110). The number of securing members 115, 117 can be proportional to the size of the panel edge that is to be secured within the channel 110. For instance, the number of securing members 115, 117 can increase with the surface area of the panel that is to be held within the channel 110. Additional securing members may be desired, for example, to provide greater panel and frame size tolerances or in embodiments where one or more caps (FIG. 4) may be desired (as shown in exemplary FIGS. 1B and 4). FIG. 1B depicts a frame interface member 100 design that includes three rows of securing members 115B, 117B on each interior surface 103, 105, of sidewalls. FIG. 1C shows a frame interface member 100 that comprises a single securing member 1015, 1017 on each sidewall 115, 117. As can be seen, the securing members 1015, 1017 of FIG. 1C comprise a thickened profile as compared to those pictured in FIGS. 1A and 1B, such that the embodiment shown in FIG. 1C comprises a bumper 1015, 1017 that extends inwardly and downwardly into the channel 110. Embodiments such as that pictured in FIG. 1C may be particularly useful when a thick panel is used along with a thin frame. Additional embodiments can comprise a combination of securing members 115, 117 with profiles substantially similar to those shown in in FIGS. 1A and B (115, 117) and those shown in FIG. 1C (1015, 1017).

As shown in FIG. 1A, the exterior surfaces 160 and 162 of the frame interface member 100 can comprise one or more coupling protrusions 140, 142, 150, 152 extending laterally from the sidewalls 102, 104. In embodiments, the first sidewall 102 comprises at least one coupling protrusion 140, 150, and the second sidewall 104 comprises at least one coupling protrusion 142, 152. At least one of the coupling protrusions 140, 150 of the first sidewall are positioned to oppose at least one of the coupling protrusions 142, 152 of the second side wall such that the frame interface member 100 comprises at least one pair of opposing coupling protrusions that are substantially aligned in a row (seen at 140, 150 & 142, 152, respectively). Embodiments such as FIG. 1A comprise an upper pair of coupling protrusions 140, 142 and a lower pair of coupling protrusions 150, 152. Some embodiments comprise more than two pairs of coupling protrusions 140, 150, 142, 152 while alternative embodiments comprise a single pair of coupling protrusion 140, 150 or 142, 152. A single pair of coupling protrusions 140, 150 or 142, 152 may be desirable in embodiments having thin frame constituents 200A, 200B. Embodiments comprise up to ten pairs of coupling protrusions 140, 150 or 142, 152. The frame interface member 100 can comprise one, two, three, four, five, six, seven, eight, nine, ten, eleven, twelve, thirteen, fourteen, or fifteen coupling protrusions 140, 150 or 142, 152. In embodiments, the number of coupling protrusions 140, 150 or 142, 152 is proportional to the depth of the channel 100, the depth of the interface retention portion of the frame constituent 200A, 200B, or a combination thereof. The number of coupling protrusions 140, 150 or 142, 152 can be proportional to the strength of the connection desired between the frame interface member 100 and the frame constituent 200A, 200B. The coupling protrusions 140, 150 or 142, 152 can be configured to accommodate caps 400 as further described below (see, for example, FIGS. 4-6 at 400, 505, 510, 605, 610, and 615). In accordance with some aspects of the disclosure, the coupling protrusions 140, 150 or 142, 152 can include an angled insertion surface 148, 149, 158, 159 to facilitate insertion of the frame interface member 100 into a frame constituent (seen at 200A & 200B of FIGS. 2-4) and an opposite surface 144, 146, 154, 156 to help secure the frame interface member 100 into the frame constituent after the frame interface member 100 is inserted therein (e.g., see FIG. 3 as further described below). The opposite surface 144, 146, 154, 156 may be lateral (i.e., substantially flat or flat).

The frame interface member 100 can further include at least one seal 116, 118. In embodiments, the seal 116, 118 is disposed on the top surface of each sidewall 102, 104. Each seal 116, 118 can comprise an abutting edge 114, 119, a seal extension 112, 120, or a combination thereof. In embodiments, the abutting edge 114, 119 is configured to interface with at least one surface of a panel. The junction between the abutting edge 114, 119 and the panel can be sufficiently tight such that water or particles are prevented from entering within the channel 110 when a panel is disposed therein (e.g., water-tight, air-tight, sand-tight). In addition, the abutting edges 114, 119 can prevent damage to the panel edge upon insertion, adjustment, installation or operation. For example, the seal 116, 118 can be particularly useful in shower door applications to prevent shattering of tempered glass, which is designed to break in small pieces upon damage to of any portion of the glass. As particularly evident in FIG. 5A, seal extensions 112, 120 can provide a sufficiently tight junction between the frame interface member 100 and the frame constituent 200A, 200B such that water or particles are prevented from entering any gap between the frame constituent 200A, 200B and the frame interface member 100.

The frame interface member 100 can comprise or be constructed of any one or more of the following non-limiting, exemplary materials: ethylene propylene diene monomer (EPDM) rubber, polyvinylchloride (PVC), thermoplastic vulcanisate (TPV), thermoplastic elastomer (TPE), thermoplastic polyolefin (TPO), polypropylene, polycarb, thermoplastic polyurethane (TPU), or any combination thereof. In some embodiments, the frame interface member comprises extruded or molded vinyl. In embodiments, the frame interface member 100 comprises a rigid material, a flexible material, or a combination thereof. Some embodiments comprise a dual durometer frame interface member 100 wherein a first portion of the frame interface member 100 comprises of a rigid material and a second portion of the frame interface member 100 comprises of a flexible material. In embodiments, the rigid material comprises a material that is harder than the flexible material. In embodiments, the one or more securing members 115, 117, the seal 116, 118, or a combination thereof can comprise a flexible material that is softer than the body 101 of the frame interface member 100. In embodiments, the securing members 115, 117, the seal 116, 118, or a combination thereof comprise a silicone rubber material or any other similar durable and resistant elastomer type compound. In certain embodiments, the body 101 comprises a rigid material and the securing members 115, 117 comprise a flexible material.

Figure 2A:
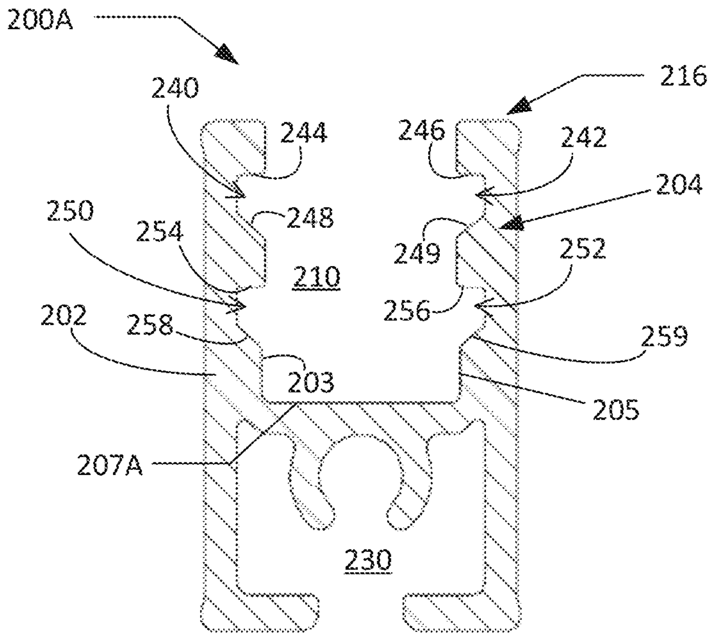
FIG. 2A provides a cross-sectional view of an exemplary frame constituent according to embodiments of the disclosure.
Figure 2B:
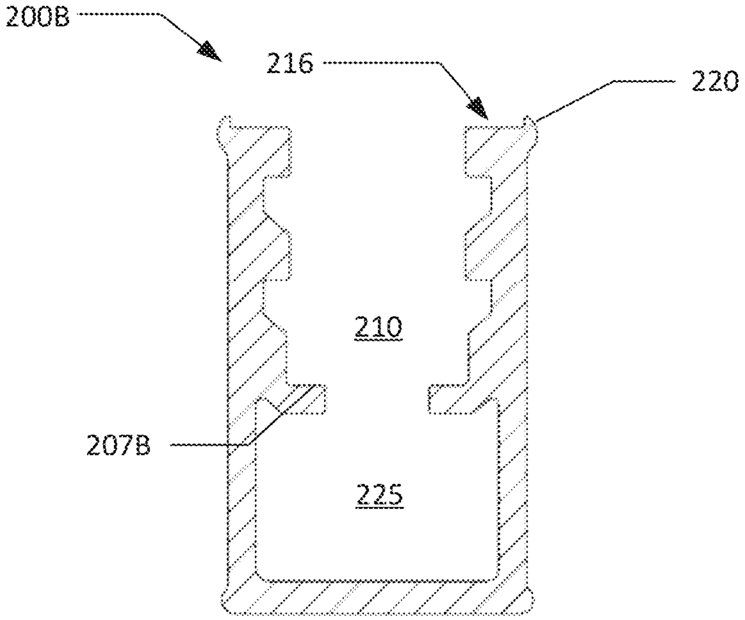
FIG. 2B shows a cross-sectional view of another exemplary frame constituent according to embodiments of the disclosure.

Referring now to FIGS. 2A and 2B, cross-sectional views of exemplary frame constituents 200A, 200B are shown. The frame constituent 200A and 200B can comprise two opposing walls 202, 204 and an interface member abutting surface 207A, 207B. In embodiments, the interior surfaces 203, 205 of the walls 202, 204 and the interface member abutting surface 207A, 207B define an interface retention portion 210. As can be seen, the interface retention portion 210 can comprise a shape that is substantially complementary to the shape of the frame interface member (seen at 100 in FIGS. 1A-1C), such that the interface retention portion 210 is configured to receive and hold the frame interface member 100 therein. As can be seen, in embodiments such as FIGS. 2A and 2B, the interface retention portion 210 can comprise a substantially U-shaped body or profile.

In accordance with some embodiments, the frame constituent 200A includes a recess 225 for securing the frame constituent 200A with or onto a housing structure, such as a wall jamb, window jamb, or door jamb or onto an adjacent panel, e.g., via a c-shaped anchor, by screw, or any other securing mechanism used in the art. The recesses 225 may be open or closed to the channel, as shown in FIGS. 2B, and 2A, respectively. The recess 225 may be configured to receive a wire (not shown) or otherwise serve as a space to enlarge the size of the frame constituent 200B, as shown in FIG. 2B. The recess 225 may have a bottom 230 that is open (shown in FIG. 2A) or closed (closed in FIG. 2B) to, for example, receive a fastener (not shown).

As seen in FIG. 2B, the top surface 216 of at least one wall 202, 204 can comprise a projection 220 that can be configured to interface with at least one seal extension (seen at 112, 120 of FIG. 1A) of the frame interface seal 116. In embodiments, improved water resistance can be achieved when the projection 220 interfaces with the seal 116 of the frame interface member 100. The projection 220 can be further configured to retrain the integrity of the seal 116 or otherwise prevent the seal 116 from degradation over time.

In embodiments, the interior surfaces 203, 205 of the frame constituent walls 202, 204 comprise one or more coupling recesses 240, 242, 250, 252 configured to receive and hold the respective coupling protrusions of the frame interface member (seen at 140, 142, 150, 152 of FIG. 1A). In embodiments, the first wall 202 of the frame constituent 200 comprises at least one coupling recess 240, 242, and the second wall 204 of the frame constituent comprises at least one coupling recess 242, 252, and at least one of the coupling recesses 240, 250 of the first wall are positioned to oppose at least one of the coupling recesses 242, 252 of the second wall such that the frame constituent 200A comprises at least one pair of opposing coupling recesses (seen at 240, 250 & 242, 252, respectively). In embodiments, the number of coupling recesses 240, 242, 250, 252 is the same as the number of coupling protrusions on the frame interface member 100 (seen at 140, 142, 150, 152 of FIG. 1A). In some embodiments, the number of coupling recesses 240, 242, 250, 252 is less than the number of coupling protrusions (seen at 140, 142, 150, 152 of FIG. 1A). The number of coupling recesses 240, 242, 250, 252 can be more than the number of coupling protrusions (seen at 140, 142, 150, 152 of FIG. 1A). Embodiments comprise up to ten pairs of coupling recesses 240, 242, 250, 252. The frame interface member 100 can comprise one, two, three, four, five, six, seven, eight, nine, ten, eleven, twelve, thirteen, fourteen, or fifteen coupling recesses 240, 242, 250, 252. In embodiments, the number of coupling recesses 240, 242, 250, 252 is proportional to the depth of the channel 100, the depth of the interface retention portion of the frame constituent 200A, 200B (see FIGS. 2A and 2B at 210), or a combination thereof. The number of coupling recesses 240, 242, 250, 252 can be proportional to the strength of the connection desired between the frame interface member 100 and the frame constituent 200A, 200B.

Figure 3:
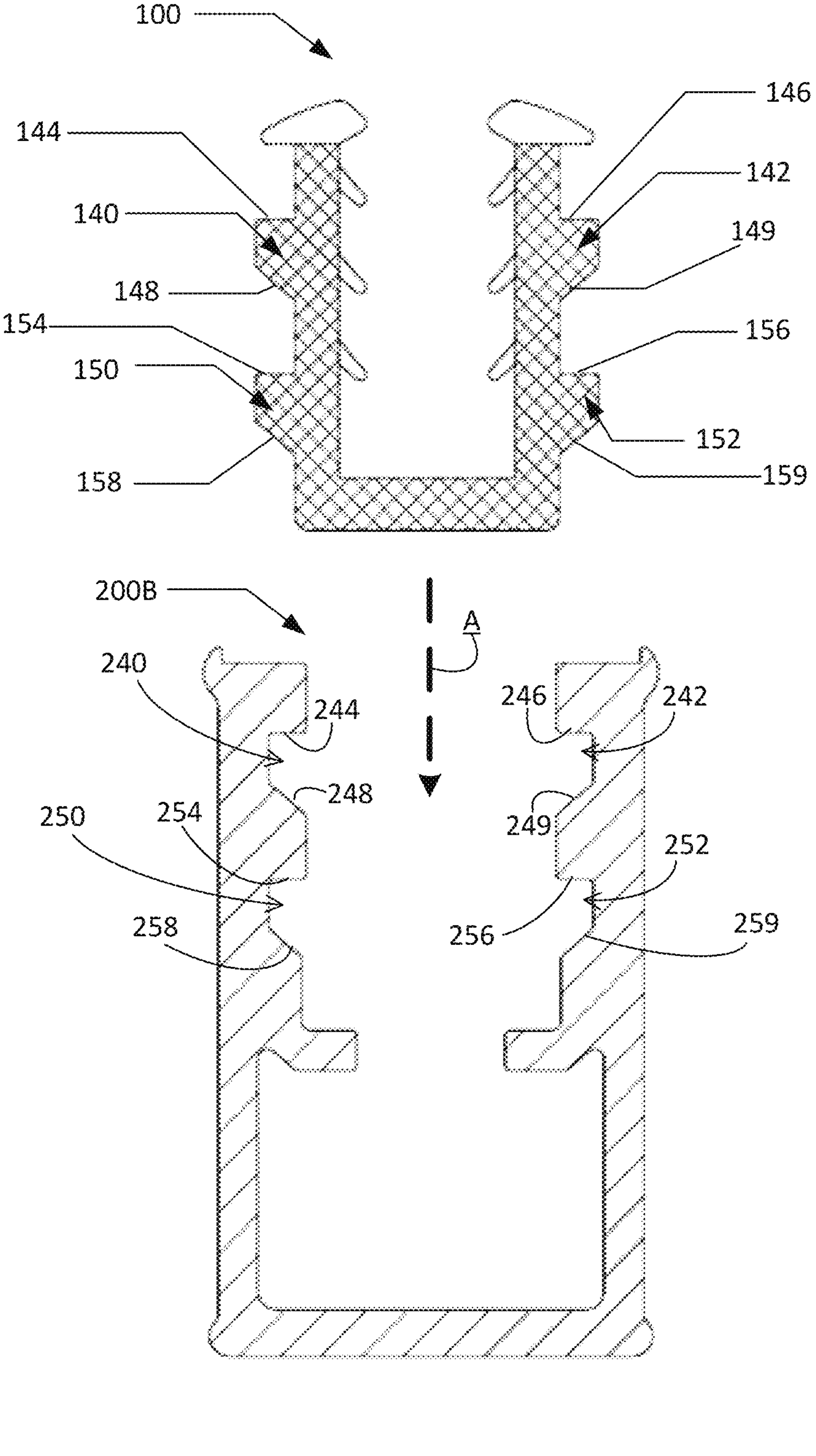
FIG. 3 provides a cross-sectional view of the exemplary frame interface member in FIG. 1B and the frame constituent of FIG. 2B, wherein the exemplary frame interface member is positioned directly above the frame constituent in preparation for insertion therein.

FIG. 3 shows a cross-section view of the exemplary frame interface member 100 in FIG. 1B and the frame constituent 200B of FIG. 2B aligned for insertion in direction A in accordance with some aspects of the disclosure. As shown, at least one of the coupling recesses 240, 242, 250, 252 can include an angled surface 248, 249, 258, 259 that is complementary to at least one angled surface 148, 149, 158, 159 of at least one of the coupling protrusions 140, 142, 150, 152 of the frame interface member 100 to facilitate insertion of the frame interface member 100 into the frame constituent 200B and secure the frame interface member 100 with the frame constituent 200B. The frame constituent 200B can also comprise at least one opposite surface 244, 246, 254, 256 configured to interact with at least one opposite surface 144, 146, 154, 156 of at least one of the coupling protrusions 140, 142, 150, 152 of the frame interface member 100 to secure the frame interface member 100 into the frame constituent 200B after the frame interface member 100 is inserted therein. As can be seen, when moved in the direction of arrow A, the lower pair of opposing coupling protrusions 150, 152 of the frame interface member 100 can engage with either the upper pair of coupling recesses 240, 242 or the lower pair of coupling recesses 250, 252 of the frame constituent 200B, which can permit customization of the height of the frame interface member 100 relative to the frame constituent 200B. For instance, when the lower pair of opposing coupling protrusions 150, 152 are seated within the upper pair of coupling recesses 240, 242, secured frame interface member 100 and frame constituent 200B comprise a taller profile than when the lower pair of opposing coupling protrusions 150, 152 is seated within the lower pair of coupling recesses 250, 252. Thus, optional heights of the glazing bead system can be configured or customized depending on the (1) number of coupling protrusions 140, 142, 150, 152 and coupling recesses 240, 242, 250, 252 and (2) the depth of which the interface member 100 is inserted into the frame constituent 200B.

Figure 4:
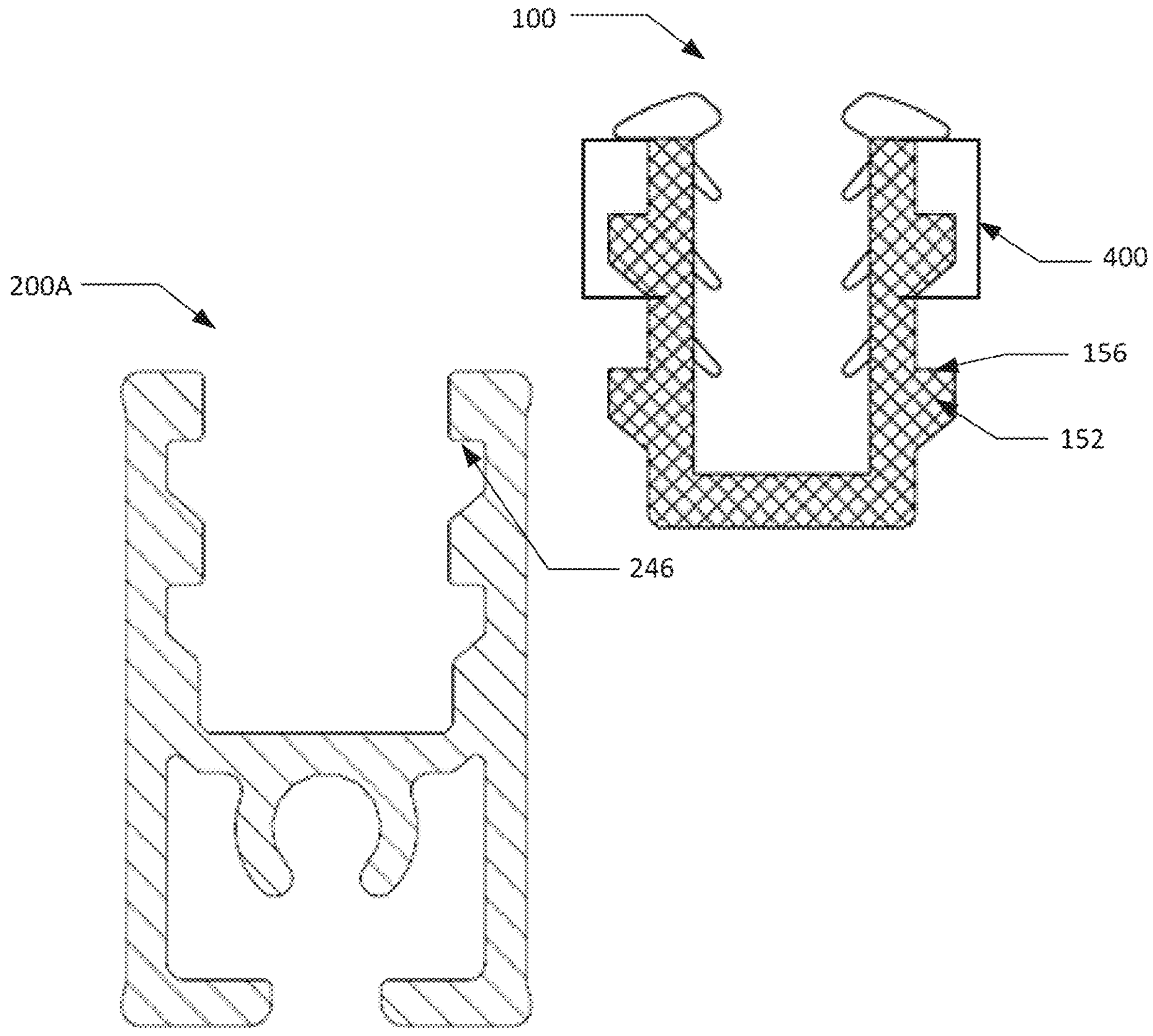
FIG. 4 shows a cross-sectional view of the exemplary frame interface member in FIG. 1B and the frame constituent depicted in FIG. 2A. As can be seen in this embodiment, the frame constituent includes a cap.

In accordance with additional embodiments of the disclosure, FIG. 4 depicts a cross-sectional view of the exemplary frame interface member 100 in FIG. 1B and the frame constituent 200A depicted in FIG. 2A, wherein the frame interface member 100 comprises a cap 400 positioned over each of the top coupling protrusions 140, 142 of the frame interface member 100. The configuration shown in FIG. 4 permits the lower pair of coupling protrusions 152, 154 to be seated within the upper pair 240, 242 of coupling recesses such that the lower opposite surface 156 of the frame interface member 100 interfaces with only the upper opposite surface 246 of the frame constituent 200A. Thus, when the frame interface member 100 is so inserted, the total height of the glazing bead system is increased (which may be desired to fill in adjustment gaps or in accordance with design features). In addition, the cap 400 can be positioned on the projecting portion of the frame interface member 100. In embodiments, the cap 400 can be configured to cover at least a section of at least one sidewall 102, 104 of the frame interface member 100 to improve the aesthetics of the glazing bead system, particularly when the glazing bead system assumes a tall configuration. In embodiments, the cap 400 can be configured to cover only a single coupling protrusion (as shown at 400) or can be configured to cover more than one coupling protrusion 152, 154. The cap can be configured to cover any number of coupling protrusions 152, 154 that may be exposed when the glazing bead system assumes an elevated height. In embodiments, the cap 400 is removable and can be configured to permit customization of the glazing bead system aesthetics. Size and configurations of the cap 400 may vary in accordance with design preferences and space limitations.

FIGS. 5A, 5B, 6A, and 6B show exemplary configurations of the glazing bead system with and without caps and provide examples of how different caps may be incorporated into the presently disclosed glazing bead system.

Figure 5A:
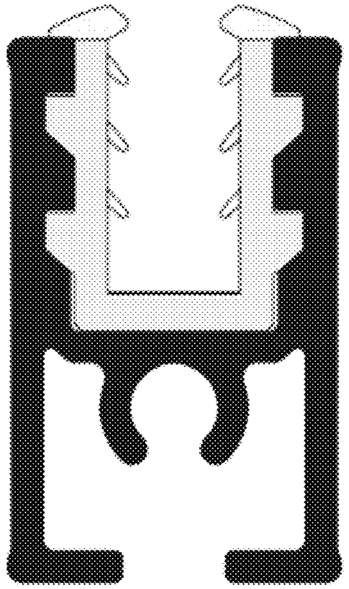
FIG. 5A provides a cross-sectional view of an exemplary frame interface member without a cap wherein coupling protrusions of the frame interface member are fully inserted into the recesses of the frame constituent in accordance with certain embodiments of the disclosure.
Figure 5B:
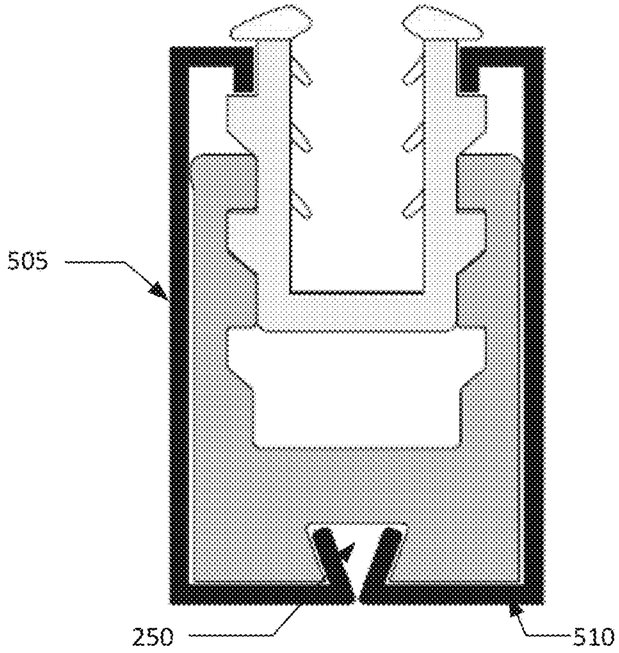
FIG. 5B shows a cross-sectional view a frame interface member partially inserted into the frame constituent and having two exemplary caps (one on each side) in accordance with embodiments of the disclosure.
Figure 6A:
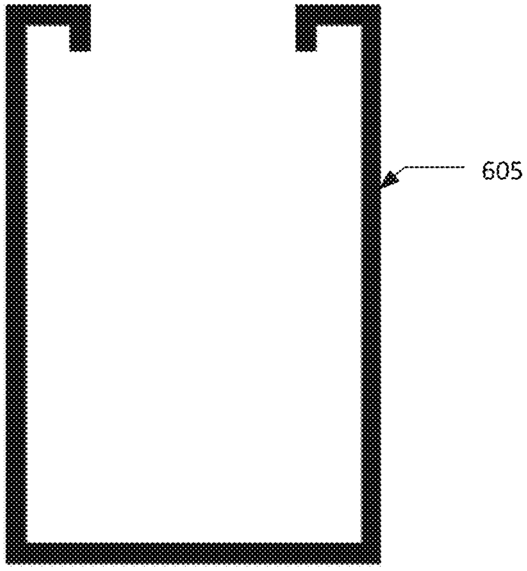
FIG. 6A shows a cross-sectional view of a cap in accordance with one embodiment.
Figure 6B:
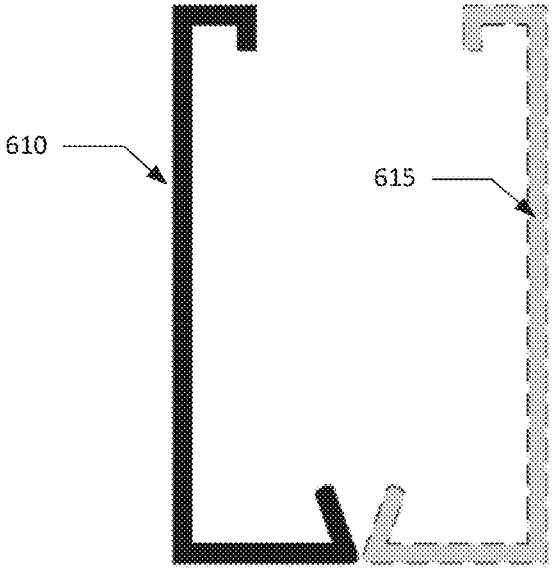
FIG. 6B provides a cross-sectional view of another set of exemplary set of decorative caps shown in FIG. 5B assembly and in accordance with embodiments of the disclosure.

In FIG. 5A, the frame interface member 100 is shown fully inserted into the frame constituent 200A such that both pairs of the coupling protrusions 140, 142, 150, 152 are seated within the coupling recesses 240, 242, 250, 252. As can be seen, there is no cap 400 present in the embodiment shown in FIG. 5A. FIG. 5B shows a cross-sectional view of an exemplary frame interface member 100 having the lower pair of coupling protrusions 150, 152 inserted into an exemplary frame constituent 200A, 200B, wherein the frame constituent 200A, 200B comprises a cap retaining feature 250 that allows for retention of caps 505, 510 to be removably fixed thereon. As shown in FIG. 5B, in some embodiments, the caps 505, 510 are configured to substantially cover the walls 202, 204 of both the frame constituent 200A, 200B and the frame interface member 100. In alternate embodiments, the caps 505, 510 are configured to cover only a portion of the walls 202, 204 of the frame constituent 200A, 200B, the frame interface member 100, or a combination thereof. As shown in FIG. 5B, the caps 505, 510 can be configured to cover only one side of the glazing bead system. In embodiments such as the one shown in FIG. 6A, a single cap 605 can be configured to cover both sides of the glazing bead system. As shown in FIG. 6B, the glazing bead system can comprise two caps, 610, 615, wherein the first cap 610 comprises at least one aesthetic feature that is different from at least one aesthetic feature of the second cap 615. By way of example, the first cap 605 can comprise a color, rigidity, texture, or other aesthetic feature that is not present in the second cap 615 or vice versa.

Figure 7:
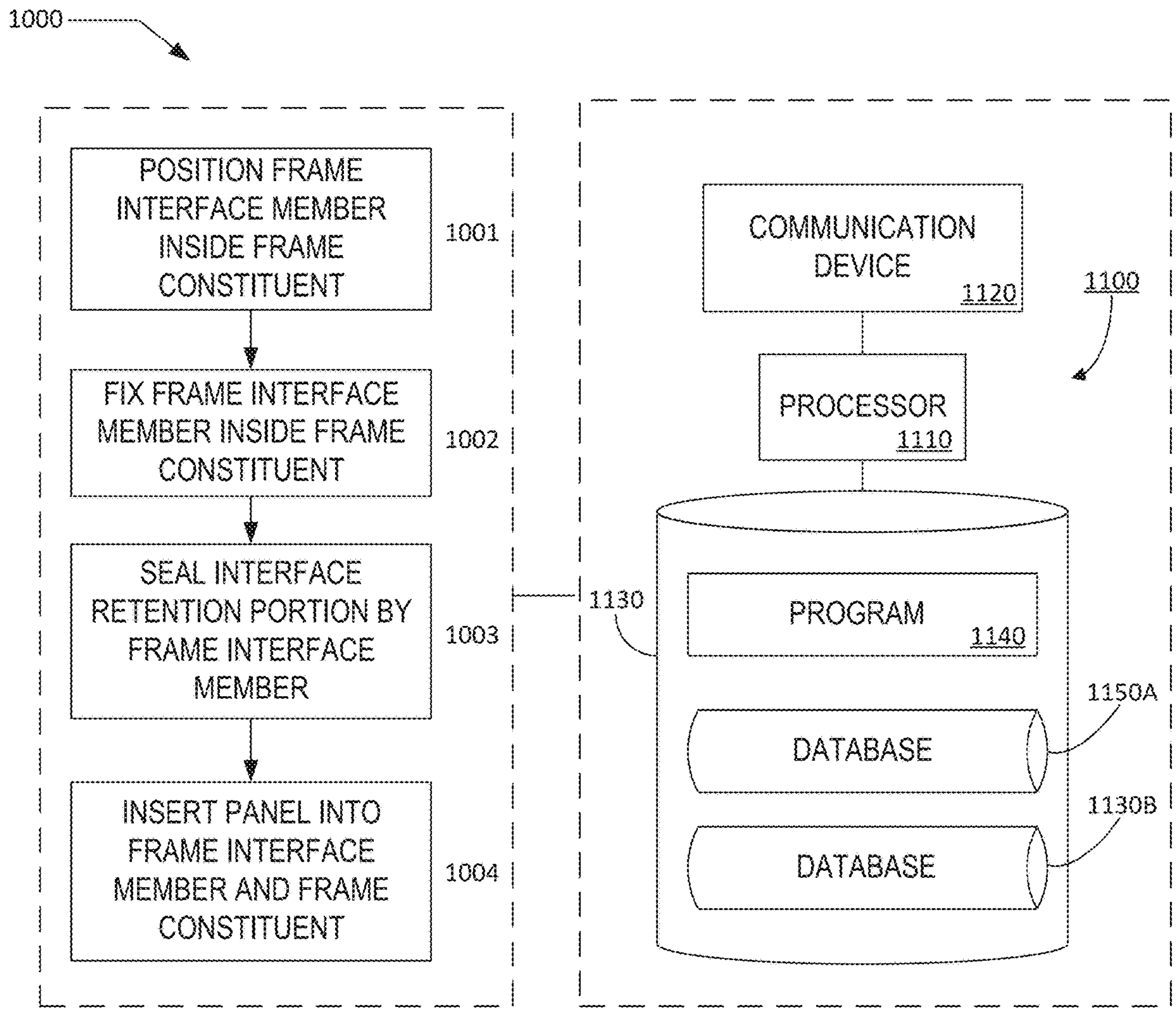
FIG. 7 is a flowchart illustrating steps that can be implemented during the manufacturing of a framed panel and using the frame interface member in accordance with embodiments of the disclosure.

Referring now to FIG. 7, a flowchart 1000 illustrating exemplary steps implemented during the manufacturing of a framed panel and using the frame interface member 100 in accordance with aspects of the disclosure is shown. By this disclosure, it is appreciated by those skilled in the art the importance of being able to insert the frame interface member 100 into the frame constituent 200A, 200B prior to positioning of the edge of the panel inside of the frame interface member 100. The length, and thus cutting of the lengths, of frame interface member 100 or a frame constituent 200A, 200B can be performed together or independently of one another (i.e., before or at any point after step 1001).

Beginning at step 1001, a length of frame interface member 100 is positioned inside a rigid interface retention portion 210 of a frame constituent 200A, 200B. At step 1002, at least a portion of the frame interface member 100 is generally fixed or secured into the frame constituent 200A, 200B by at least one level or pair of coupling protrusions 140, 142, 150, 152 located on the exterior surface 160, 162 of the frame interface member sidewalls 102, 104. At step 1003, the rigid interface retention portion 210 of the frame constituent 200A, 200B can take place by virtue of the seal 116, 118 included in the frame interface member 100. After the frame interface member 100 is secured in the frame constituent 200A, 200B, at step 1004, the edge of a panel is inserted into the channel 110 of the frame interface member 100. In accordance with the steps disclosed and the order in which they are described, it is to be appreciated that any one or more steps or the entire process may be automated. A controller 1100 that can be used in some embodiments of the present invention is illustrated. The controller 1100 includes a processor 1110, which can include one or more processor components coupled to a communication device 1120. The communication device 1120 can be configured to communicate information via a communication channel to electronically transmit and receive digital data related to the functions discussed herein.

The communication device 1120 can also be used to communicate, for example, with one or more human readable display devices, such as, for example: an LCD panel, a LED display or other display device or printer and a computer numerical control (CNC) machine or any similar robotic programmable machine. The processor 1110 can also be in communication with a storage device 1130. The storage device 1130 can comprise any appropriate information storage device, including combinations of magnetic storage devices (e.g., magnetic tape, radio frequency tags, and hard disk drives), optical storage devices, and/or semiconductor memory devices such as Random-Access Memory (RAM) devices and Read-Only Memory (ROM) devices.

The storage device 1130 can store a program 1140 for controlling the processor 1110 and accessing an inventory. In embodiments, the processor 1110 performs instructions of the program 1140 in accordance with one or more of the steps 1001-1004 as described above, and thereby operates in accordance with the present invention. For example, the processor 1110 can receive information describing inventory, stock lengths, frame or frame interface member pressure thresholds for insertion, and the like. The storage device 1130 can also store manufacturing related data received from remote sources such as an ordering portal, directly from the manufacture's network, a third party, or imputed by the user, in one or more databases 1150A and 1130B. Other steps commonly known in the fields of fenestration and automation control may also be incorporated.

Other features and advantages of the invention will be apparent from and are encompassed by the following detailed description and claims.

Thus, it is intended that the present disclosure covers such modifications and variations as come within the scope of the appended claims and their equivalents. Other objects, features, and aspects of the present disclosure are disclosed in or are apparent from the following description. It is to be understood by one of ordinary skill in the art that the present disclosure is a description of exemplary embodiments only and is not intended as limiting the broader aspects of the present disclosure.

What is claimed is:

1. A glazing bead system comprising a frame interface member, a frame constituent , and a cap, wherein the frame interface member comprises:

a body comprising a base, a first sidewall, and a second sidewall, wherein the base and the first and second sidewalls each comprise an interior surface and an external surface;

a channel defined by the interior surfaces of the base and the first and second sidewalls;

a lower pair of opposing coupling protrusions and an upper pair of opposing coupling protrusions disposed on the exterior surface of the first and second sidewalls;

a first securing member disposed on the interior surface of the first sidewall and a second securing member disposed on the interior surface of the second sidewall, wherein each of the body and the coupling protrusion are constructed of a rigid material and each of the first and second securing members are constructed of a flexible material, wherein the frame constituent comprises:

an interface member abutting surface, a first frame wall, and a second frame wall, wherein the interface member abutting surface and the first and second frame walls each comprise an interior surface and an external surface;

an interface retention portion defined by the interior surfaces of the interface member abutting surface and the first and second frame walls, wherein the body of the frame interface member has a frame interface member profile, and the interface retention portion has an interface retention portion profile that is substantially complementary to the frame interface member profile; and a pair of opposing coupling recesses disposed on the interior surface of at least one of the first and second frame walls, wherein each coupling protrusion of the lower and upper pairs of opposing coupling protrusions has a coupling protrusion profile and each coupling recess of the pair of opposing coupling recesses has a coupling recess profile that is substantially complementary to the coupling protrusion profile, wherein the lower pair of opposing coupling protrusions is configured to friction fit within the pair of opposing coupling recesses, and wherein the cap is configured to be positioned and affixed over the upper pair of opposing coupling protrusions.

2. The glazing bead system of claim 1, wherein each of the first and second securing members extend inwardly and downwardly into the channel and toward the base.

3. The glazing bead system of claim 1, wherein the first securing member is disposed oppositely across the channel from the second securing member to form at least one pair of opposing securing members.

4. The glazing bead system of claim 1, further comprising up to five rows of securing members, wherein the first securing member and the second securing member are arranged in a first row of the up to five rows.

5. The glazing bead system of claim 1, wherein the flexible material has a Shore hardness of up to 100A.

6. The glazing bead system of claim 1, wherein rigid material has a Shore hardness of up to 100D.

7. The glazing bead system of claim 1, wherein each coupling protrusion of the lower and upper pairs of opposing coupling protrusions and each coupling recess of the pair of opposing coupling recesses comprise an angled surface and an opposite surface, wherein the angled surface of each coupling protrusion is complementary to the angled surface of each coupling recess and the opposite surface of each coupling protrusion is complementary to the opposite surface of each coupling recess.

8. The glazing bead system of claim 7, wherein the angled surfaces of each coupling recess and each coupling protrusion are configured to permit insertion of the frame interface member into the interface retention portion of the frame constituent, and wherein the opposite surfaces of each coupling recess and each coupling protrusion are configured to resist removal of the frame interface member from the interface retention portion.

9. The glazing bead system of claim 1, wherein the first and second sidewalls each comprise a top surface, and wherein the glazing bead system comprises a flexible seal disposed on the top surface of at least one of the first and second sidewalls.

10. A method for glazing a panel, comprising:

providing a panel comprising an edge and at least one surface;

providing a frame interface member comprising a base, a first sidewall, and a second sidewall, wherein the base and the first and second sidewalls each comprise an interior surface and an external surface, a channel defined by the interior surfaces of the base and the first and second sidewalls, a lower pair of opposing coupling protrusions and an upper pair of opposing coupling protrusions disposed on the exterior surface of the first and second sidewalls, and a first securing member disposed on the interior surface of the first sidewall and a second securing member disposed on the interior surface of the second sidewall, wherein each of the body and the coupling protrusion are constructed of a rigid material and each of the first and second members are constructed of a flexible material;

providing a frame constituent comprising an interface member abutting surface, a first frame wall, and a second frame wall, wherein the interface member abutting surface and the first and second frame walls each comprise an interior surface and an external surface, an interface retention portion defined by the interior surfaces of the interface member abutting surface and the first and second frame walls, wherein the body of the frame interface member has a frame interface member profile, and the interface retention portion has an interface retention portion profile that is substantially complementary to the frame interface member profile, and an upper pair of opposing coupling recesses and a lower pair of opposing coupling recesses disposed on the interior surface of the first and second frame walls, wherein the coupling protrusion has a coupling protrusion profile and the coupling recess has a coupling recess profile that is substantially complementary to the coupling protrusion profile, and wherein the coupling protrusion is configured to friction fit within the coupling recess;

inserting the frame interface member into the interface retention portion of the frame constituent until the lower pair of opposing coupling protrusions seats within the upper pair of coupling recesses;

positioning the edge of the panel along the channel of the frame interface member; and inserting the edge of the panel into the channel of the frame interface member until the first and second securing members frictionally engage with the at least one surface of the panel to secure the panel within the channel, and affixing a cap over the upper pair of opposing coupling protrusions.

11. The method of claim 10, wherein the panel comprises a shower door panel, a window panel, or a room divider panel.

12. The method of claim 10, wherein the frame interface member is inserted into the frame retention portion until the exterior surface of the base of the frame interface member contacts the interior surface of the frame abutting portion of the frame constituent.

13. The method of claim 10, wherein the first and second sidewalls each comprise a top surface, and wherein a flexible seal is disposed on the top surface of at least one of the first and second sidewalls, and wherein the method further comprises creating a substantially water-impermeable seal between the frame interface member and the frame constituent, between the panel and the frame interface member, or a combination thereof.

* * * * *